United States Patent
Qiu et al.

(10) Patent No.: US 10,432,439 B2
(45) Date of Patent: Oct. 1, 2019

(54) MSK TRANSCEIVER OF OQPSK DATA

(71) Applicant: Texas Instruments Incorporated, Dallas, TX (US)

(72) Inventors: Wenxun Qiu, Allen, TX (US); Tomas Motos, Hamar (NO)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/858,771

(22) Filed: Dec. 29, 2017

(65) Prior Publication Data

US 2019/0207792 A1 Jul. 4, 2019

(51) Int. Cl.
*H04L 27/20* (2006.01)
*H04L 27/00* (2006.01)
*H04L 1/00* (2006.01)
*H04B 1/7097* (2011.01)

(52) U.S. Cl.
CPC ....... *H04L 27/2014* (2013.01); *H04B 1/7097* (2013.01); *H04L 1/0071* (2013.01); *H04L 27/0008* (2013.01); *H04B 2201/709709* (2013.01)

(58) Field of Classification Search
CPC ...... H04B 1/7097; H04B 2201/709709; H04L 1/0071; H04L 27/0008; H04L 27/2014

USPC .......................................... 375/130, 140, 141
See application file for complete search history.

(56) References Cited

U.S. PATENT DOCUMENTS

| | | | | |
|---|---|---|---|---|
| 7,466,780 | B2* | 12/2008 | Umeno | G06F 7/586 375/350 |
| 2002/0122468 | A1* | 9/2002 | Belkerdid | H04B 1/707 375/146 |
| 2014/0369444 | A1* | 12/2014 | Park | H04L 27/22 375/302 |
| 2015/0215064 | A1* | 7/2015 | Quick, Jr. | H04J 11/0063 370/210 |
| 2017/0195006 | A1* | 7/2017 | Krasner | H04B 1/709 |
| 2017/0317712 | A1* | 11/2017 | Graceffo | H04B 1/707 |

* cited by examiner

Primary Examiner — Siu M Lee
(74) Attorney, Agent, or Firm — Brian D. Graham; Charles A. Brill; Frank D. Cimino

(57) ABSTRACT

A wireless transmitter for transmitting bits to a wireless receiver. The wireless transmitter comprises: (i) circuitry for generating binary data bits; and (ii) circuitry for providing a first spreading sequence for a first bit in the binary data bits and for providing a second spreading sequence for a second bit in the binary data bits, wherein the second bit is complementary to the first bit. Each spreading sequence consists of an integer number N of bits, and the circuitry for providing provides a same bit value in an integer number M of bit positions in the first and second spreading sequences, where M<N.

20 Claims, 6 Drawing Sheets

TABLE 1

| BINARY VALUE | OQPSK SPREADING SEQUENCE | SEQUENCE REFERENCE |
|---|---|---|
| 0 | 0 1 0 0 1 1 1 0 | $OQPSK_{PA0}$ |
| 1 | 1 0 1 1 0 0 0 1 | $OQPSK_{PA1}$ |

TABLE 2

OQPSK to MSK

```
for k = 1:N
    if (mod (k,2) == 1)
        if c(k-1) == c(k)
            s(k) = 0;
        else
            s(k) = 1;
        end
    else
        if c(k-1) == c(k)
            s(k) = 1;
        else
            s(k) = 0;
        end
    end
end
```

FIG. 5

TABLE 3

| BINARY VALUE | OQPSK SPREADING SEQUENCE | MSK SPREADING SEQUENCE |
|---|---|---|
| 0 | 01001110 | X0111100 |

FIG. 6

TABLE 4

| BINARY VALUE | OQPSK SPREADING SEQUENCE | MSK SPREADING SEQUENCE |
|---|---|---|
| 1 | 10110001 | X0111100 |

FIG. 7

TABLE 6

| BINARY VALUE | OQPSK SPREADING SEQUENCE | MSK SPREADING SEQUENCE |
|---|---|---|
| 0 (OQPSK'$_0$) | 0 1 1 1 0 0 1 0 | X 0 0 1 1 1 1 0 |
| 1 (OQPSK'$_1$) | 1 0 1 0 1 0 0 1 | X 0 1 0 1 0 0 0 |

FIG. 10

TABLE 7

| R$_n$ | BP(1) | BP(2) | BP(3) | BP(4) | BP(5) | BP(6) | BP(7) | BP(8) |
|---|---|---|---|---|---|---|---|---|
| 0 (OQPSK'$_0$) | 0 | 1 | 1 | 0 | 0 | 0 | 1 | 1 |
| 1 (OQPSK'$_1$) | 1 | 1 | 0 | 0 | 1 | 0 | 0 | 1 |

FIG. 11

TABLE 8

| BINARY VALUE | OQPSK SPREADING SEQUENCE | MSK SPREADING SEQUENCE |
|---|---|---|
| 0 (OQPSK'$_0$) | 0 1 1 1 0 0 0 1 1 | 1 0 0 0 0 0 1 1 1 |
| 1 (OQPSK'$_1$) | 1 1 0 0 1 0 0 1 | 0 1 1 1 1 0 0 0 |

FIG. 12

TABLE 9

| MSK TO OQPSK |
|---|
| for k = 1:$N$<br>  if (mod (k,2) == 1)<br>    if s(k-1) == 0<br>      c(k) = c(k)-1;<br>    else<br>      c(k) = $\overline{c(k-1)}$;<br>    end<br>  else<br>    if s(k) == 1<br>      c(k) = c(k-1);<br>    else<br>      c(k) = $\overline{c(k-1)}$;<br>    end<br>  end<br>end |

MSK TRANSCEIVER OF OQPSK DATA

BACKGROUND

The preferred embodiments relate to wireless communication systems and, more particularly to minimum-shift keying (MSK) and offset quadrature phase shift keying (OQPSK) communications.

MSK is a particular instance of frequency shift keying, meaning each binary value is modulated by a respective different frequency, that is, a binary data value of 0 is communicated by a sinusoid at a first frequency and a binary data value of 1 is communicated by a sinusoid at a second frequency. Specifically in MSK, the two different frequencies provide a continuous phase, in that the difference between the first and second frequencies is equal to half the data rate. Because MSK transitions between 0 and 1 (or 1 and 0) have no discontinuity in phase, MSK is resistant to non-linear distortion and abrupt transitions between 0 and 1 (or 1 and 0) are avoided, thereby likewise avoiding the potential drawbacks that could arise from such disruptions (e.g., sideband interference to other channels).

OQPSK is a version of quadrature phase shift keying (QPSK), where QPSK communicates two binary values, sometimes referred to as a symbol, at a time, where the potential binary variation of each of the two values may represent any one of four different combinations (i.e., $2^2=4$)—each respective combination, therefore, is represented by one of four different quadrature (i.e., 90 degree apart) values. Moreover, for a given symbol, its two bits are separated (e.g., demultiplexed) based on the odd and even positions of the bits in a continuous group of bits, with the odd bit position typically referred to as the I bit (in-phase) and the even bit position typically referred to as the Q bit (quadrature phase). Each of the I bit and Q bit is multiplied times a respective but 90 degree apart sinusoid, for example with the I bit multiplied times a cosine wave and the Q bit multiplied times a sine wave, and the resultant waves are then added to form a summed sinusoid representing the I/Q symbol. Further, due to the orthogonality of the sine and cosine mix, the two concurrently-communicated bits do not interfere with one another and the phase of the sinusoid therefore represents (e.g., can be demodulated to provide) the binary values of the I and Q bit values that gave rise to the phase. Thus, for a sequence of symbols $S_0, S_1, \ldots S_n$, if symbol $S_0$ is represented by a first sinusoid phase corresponding to bits $I_0$ and $Q_0$, then if only one or the other of $I_0$ and $Q_0$ changes value for the next successive symbol $S_1$, the phase shift between $S_0$ and $S_1$ is 90 degrees (i.e., $\pi/2$), whereas if symbol $S_0$ is represented by a first sinusoid phase corresponding to bits $I_0$ and $Q_0$, then if both $I_0$ and $Q_0$ change values for the next successive symbol $S_1$, the phase shift between $S_0$ and $S_1$ is 180 degrees (i.e., $\pi$). In the offset version of the QPSK modulation technique, however, that is, for offset QPSK or OQPSK, then QPSK as discussed above is changed by delaying the Q bit by one-half of a symbol period (i.e., one bit period) relative to the I bit. Thus the range of phase transitions is 0 degrees and 90 degrees, that is, the possibility of a phase shift of 180 degrees is eliminated, so amplitude fluctuations that otherwise could occur from a 180 degree phase shift are eliminated, thereby lessening amplitude change intensity.

Sin-shape offset quadrature phase shift keying (sin-shaped OQPSK) is a special case of OQPSK in which the I and Q baseband signals are shaped by a half-sine function. The main benefit of this technique is that the resulting waveform has a constant envelope. Constant-envelope modulations are advantageous since they allow a simpler architecture of the transmitter power amplifier stage and the ability to run at higher efficiency levels, where efficiency is the relationship between the consumed power from the rail to the transmitted RF power.

Given the above-described attributes of the MSK and OQPSK modulation techniques, network transceivers have been constructed for each type of modulation. In this regard, a typical OQPSK receiver, equipped with a matched filter, has a better sensitivity performance than a typical MSK receiver. On the other hand, an MSK receiver, utilizing an FM demodulator, is a very simple and low-cost design, so in many cases an MSK receiver is used due to its low complexity and as a low-cost solution by trading off sensitivity performance as compared to OQPSK.

By way of further background, FIG. 1 illustrates a block diagram of a partial signal path in a prior art OQPSK transmitter (or transceiver), indicated generally at 100. In transmitter 100, information bits are input to an FEC (forward error correction) and interleaver block 112. Note that information bits are intended to be the raw data for communication, sometimes referred to baseband data, and which can represent various types of information, such as voice, image, control, and other data types. FEC and interleaver block 112 adds FEC correction to the data, and interleaving as known in the art re-arranges the ordering of data (e.g., rows to columns) so as to further enhance signal-to-noise (SNR) strength.

The output of FEC and interleaver block 112 is a binary stream, $R_n$, which is input to a bit differential encoding (BDE) block 114. BDE block 114 is included in the prior art so as to overcome some of the error spreading risk described below. Particularly, BDE block 114 modifies the input stream, to provide a corresponding output stream, $E_n$, according to the following Equation 1:

$$E_n = R_n \oplus E_{n-1} \quad \text{Equation 1}$$

Thus, BDE block 114 creates in its output an exclusive OR of an input bit with the immediately-preceding output bit.

The output binary stream, $E_n$, is connected as an input to a spreading block 116, which converts (or spreads) each binary value into a spread sequence of N (e.g., N=8) bits. The term "chips" may refer to each of these individual bits coming out of the spreading block 116, which therefore are shown and hereafter referred to as chips $QPSK_n$. Note that a "chip" may in itself be a bit (can only adopt two binary values) but this term is defined here to easily refer those bits coming from the output of spreader block 116. Spectrum spreading is a widely used technology to enhance a system's receiving sensitivity performance, so notably in connection with the lesser sensitivity performance of an MSK receiver, spectrum spreading has presented an approach, and meanwhile spreading also may be implemented in OQPSK transceivers. In one approach to spectrum spreading, a binary value is represented by a spreading sequence having a respective plurality (e.g., eight) of bits, so that a first binary value, and its respective set of bits, is more readily distinguishable from a second binary value, and its respective set of bits. For example, in the OQPSK domain, the mapping for respective prior art spreading sequences $OQPSK_{P40}$ and $OQPSK_{P41}$ for a binary value of 0 and 1 are as shown in FIG. 2, as Table 1. Note in FIG. 2 that the Hamming distance, that is, the number of bit positions at which the corresponding values are different, is eight. In other words, the prior art spreading sequence $OQPSK_{P40}$ for binary value κ is entirely the bit-by-bit complement of the prior art spreading sequence OQPSK$_{P41}$ for binary value 1. Such an approach, therefore, enhances signal recovery in an OQPSK receiver.

The spread chips QPSK$_n$ are input to an OQPSK modulator 118, which modulates the bits as an OQPSK waveform signal, that is, according to the quadrature technique described above. Moreover, where the modulator is a sin-shaped modulator, it will apply a pulse function, as shown in the following Equation 2, across two chip periods, that is, for a chip period of T$_C$, the applied pulse interval is across 2T$_C$, as follows:

$$p(t) = \begin{cases} \sin\left(\pi \dfrac{t}{2T_c}\right), & 0 \le t \le 2T_c \\ 0, & \text{otherwise} \end{cases} \quad \text{Equation 2}$$

While the above prior art approaches have served useful in various applications, as earlier noted there also are tradeoffs in the better OQPSK sensitivity performance versus the simplicity and lower cost of MSK. Thus, the present inventors seek to improve upon the prior art, as further detailed below.

SUMMARY

In an embodiment, there is a wireless transmitter for transmitting bits to a wireless receiver. The wireless transmitter comprises: (i) circuitry for generating binary data bits; and (ii) circuitry for providing a first spreading sequence for a first bit in the binary data bits and for providing a second spreading sequence for a second bit in the binary data bits, wherein the second bit is complementary to the first bit. Each spreading sequence consists of an integer number N of bits, and the circuitry for providing provides a same bit value in an integer number M of bit positions in the first and second spreading sequences, where M<N.

Numerous other inventive aspects are also disclosed and claimed.

BRIEF DESCRIPTION OF THE SEVERAL VIEWS OF THE DRAWING

FIG. 5 illustrates pseudo code for the translation of N bits from OQPSK to MSK.

FIG. 6 illustrates the translation of the sequence OQPSK$_{P40}$ into a corresponding MSK spread sequence, in a Table 3.

FIG. 7 illustrates the translation of the sequence OQPSK$_{P41}$ into a corresponding MSK spread sequence, in a Table 4.

FIG. 10 illustrates the translation of the sequences of FIG. 9 into respective MSK spread sequences, in a Table 6.

FIG. 11 illustrates, in a Table 7, a second preferred embodiment of respective OQPSK spreading sequences, corresponding to input values of binary 0 or 1, from block 214 of FIG. 8.

FIG. 12 illustrates the translation of the sequences of FIG. 11 into respective MSK spread sequences, in a Table 8.

DETAILED DESCRIPTION

Figure 1:
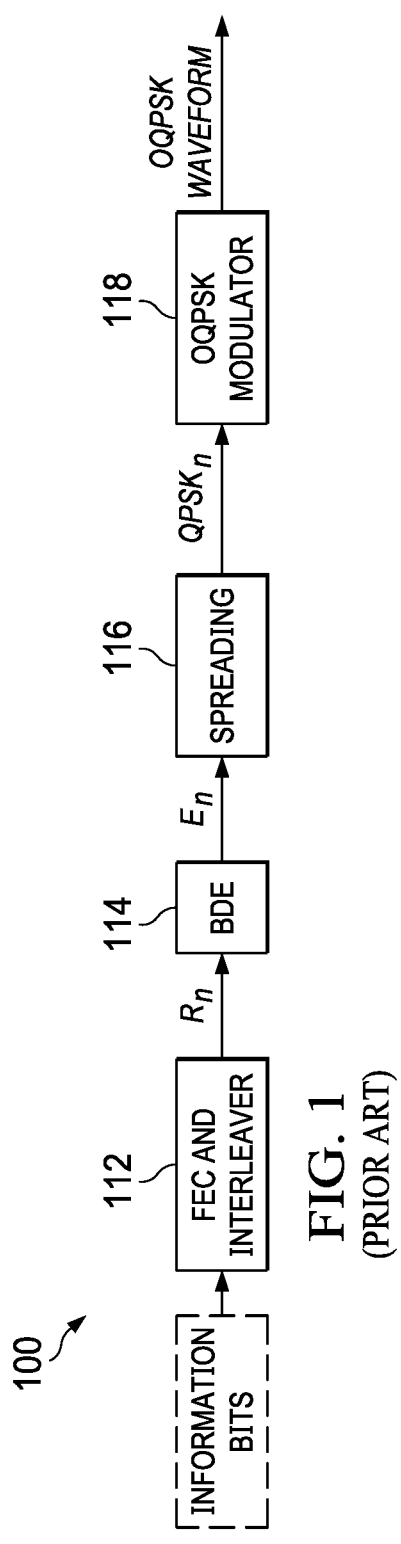
FIG. 1 illustrates a block diagram of a partial signal path in a prior art OQPSK transmitter (or transceiver).
Figures 2, 4:
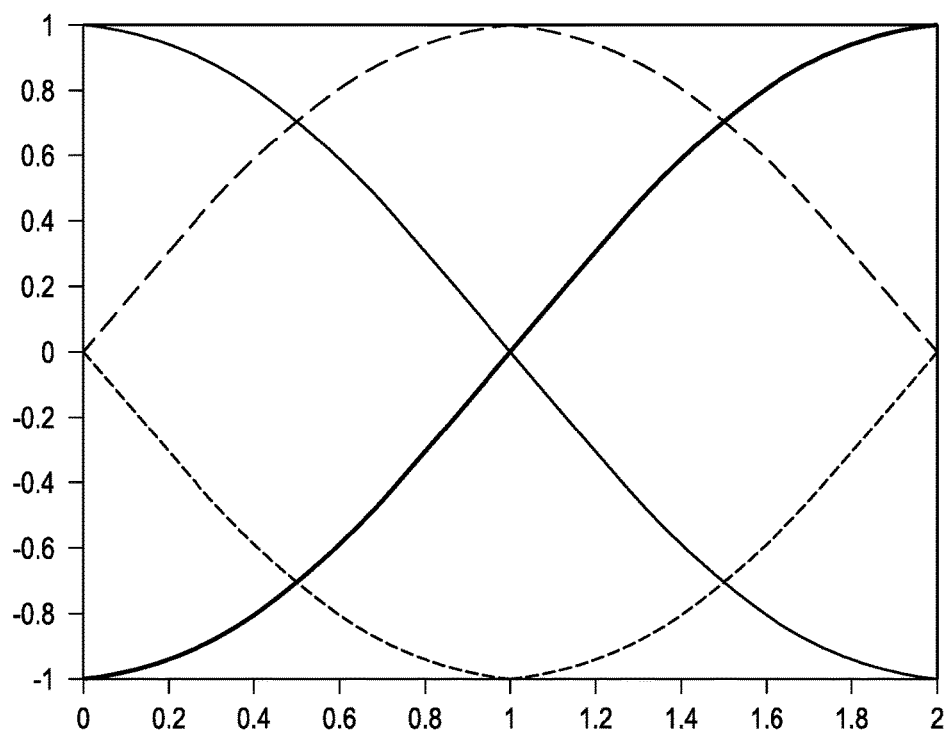
FIG. 2 illustrates, in the OQPSK domain, the mapping for respective prior art spreading sequences OQPSK$_{P40}$ and OQPSK$_{P41}$ for a binary value of 0 and 1, in a Table 1.
FIG. 4 illustrates an OQPSK signal in 2k and 2k+1 intervals.

FIGS. 1 and 2 were discussed in the earlier Background section of this document and the reader is assumed familiar with the concepts of that discussion.

With the pulse function of a sin-shaped OPQSK modulator having been introduced earlier in this document and as shown in Equation 2, additional support now introduces a preferred embodiment transmitter that ultimately communicates a waveform that is comparable as herein described to an MSK waveform, with additional spreading considerations detailed later and thus providing an understanding of preferred embodiments. Toward this end, the following provides analyses and observations of the sin-shaped OPQSK and MSK waveforms.

Figure 3:
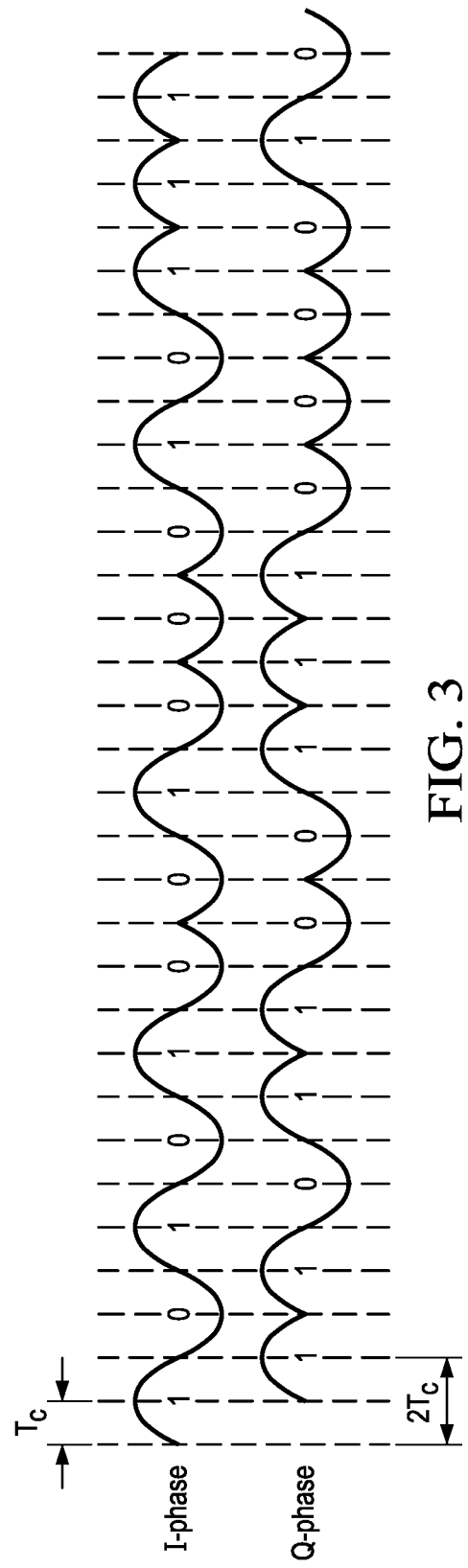
FIG. 3 illustrates respective sin-shaped OQPSK I-Phase and Q-phase waveforms for an example sequence of a chip sequence.

Further to the preceding and turning now to an additional discussion of sin-shaped OPQSK, FIG. 3 illustrates respective sin-shaped OPQSK I-Phase and Q-phase waveforms for an example sequence of a chip sequence [1 1 0 1 1 0 0 1 1 ... ], that is, where $C_0$=1, $C_1$=1, $C_2$=0, $C_3$=1, and so forth. Mathematically, the waveform can be expressed as a function of the chip value (c), to either a value of +1 or −1, and in terms of the sine and cosine waves, as shown in the following Equations 3 and 4:

$$\zeta(c) = \begin{cases} -1, & c = 0 \\ 1, & c = 1 \end{cases} \quad \text{Equation 3}$$

and $$m(t) = \sum_{k=0}^{N} \zeta(c_{2k})p(t - 2kT_c) + j\zeta(c_{2k+1})p(t - (2k+1)T_c) \quad \text{Equation 4}$$

where, the real part of m(t) corresponds to the I-phase defined above and the imaginary part of m(t) corresponds to the Q-phase.

Note that the transmitted, over-the-air, modulated real signal from Equation 4 is given by the following Equation 5:

$$s_{OQPSK}(t) = A[m_I(t)\cos(2\pi f_c t) + m_Q(t)\sin(2\pi f_c t)] \quad \text{Equation 5}$$

Still further, it is now demonstrated that the m(t) signal, as defined, possesses the characteristic of being a constant-envelope signal (i.e., the amplitude is constant at all times). Specifically, FIG. 4 illustrates the m(t) signal in 2k and 2k+1 intervals, with the interval T$_C$ normalized to 1. Looking in more detail, in the 2k interval (i.e., horizontal axis 0 to 1), the I-phase signal is in its first half of the sine (i.e., sin(x) when x∈[0, π/2]), whereas the Q-phase signal is in the second half of the sine (i.e., sin(x) when x∈[π/2, π]). In the 2k+1 interval (i.e., horizontal axis 1 to 2), the I-phase signal is in its second half of the sine, whereas the Q-phase has started a new chip and is now in the first part of the sine. Moreover, in the 2k interval first chip, one may simplify the signal equation (again, with normalized $T_C$ for simplicity), as in the following Equation 6:

$$m_{2k}(t) = \zeta\sin\left(\pi\frac{t}{2}\right) + j\zeta'\sin\left(\pi\frac{t-1}{2}\right) = \zeta\sin\left(\pi\frac{t}{2}\right) + j\zeta'\cos\left(\pi\frac{t}{2}\right) \quad \text{Equation 6}$$

And, similarly, in the 2k+1 interval second chip, one may equivalently write the signal equation (again, with normalized $T_C$ for simplicity), as the following Equation 7:

$$m_{2k+1}(t) = \zeta\cos\left(\pi\frac{t}{2}\right) + j\zeta''\sin\left(\pi\frac{t}{2}\right) \quad \text{Equation 7}$$

Since the factors of $\zeta$, $\zeta'$ and $\zeta''$ in Equations 6 and 7 are either 1 or −1 (see earlier, Equation 3), then Equations 6 and 7 reduce to Euler's equation. Moreover, note also that the cos and sin functions switch places between the even and odd chips.

Further to the preceding and turning now to an additional discussion of MSK, MSK is a specific case of continuous phase frequency shift Keying (CPFSK) when the modulation index is exactly 0.5. The modulation index is normally represented by the letter h. CPFSK is a constant-envelope modulation defined by the following Equation 8:

$$s_{MSK}(t) = \Re(Ae^{j(2\pi f_c t + k(t))}) = \quad \text{Equation 8}$$
$$A(\cos(k(t))\cos(2\pi f_c t) - \sin(k(t))\sin(2\pi f_c t))$$

In MSK, the message k(t) is itself restricted according to the following Equation 9:

$$k(t) = \pi h \sum_{i=-\infty}^{t} \alpha_i q(t - iT_s) = \frac{\pi}{2}\sum_{i=-\infty}^{t}\alpha_i q(t - iT_s) \quad \text{Equation 9}$$

where, we have already used the fact that h=0.5. In equation 9 the q(t) function is defined as a linear trajectory as shown in the following Equation 10:

$$q(t) = \begin{cases} 0, & t < 0 \\ \frac{t}{T_s}, & 0 \le t \le T_s \\ 1, & 1, t > T_s \end{cases} \quad \text{Equation 10}$$

In other words, according to the value of the a, symbols [+1 or −1], the k(t) signal travels a total of a positive π/2 or negative π/2 degrees during each of the symbol intervals ($T_s$). The travel in this time is given by a linear function q(t). The start point of each of the phases is always the end point from the previous symbol (this is guaranteed by the summation element in the formula). This fact is the defining factor for the name of continuous phase frequency shift keying.

Given the previous equations, if restricting observation to the signal k(t) in a single $T_s$ period, called period i, the signal may be as shown in the following Equation 11:

$$k_i(t) = \frac{\pi}{2}\alpha_i\frac{t}{T_s} + \theta_{i-1} \quad \text{Equation 11}$$

where, all the previous phase accumulations from the symbols up to i−1 are rolled into the starting phase in value $\theta_{i-1}$. For notation simplicity and without loss of generality, $T_s$ is now normalized as was done in the earlier observations of OQPSK, and substitution the previous equation into $S_{MSK}(t)$ provides the following Equation 12:

$$s_{MSK,i}(t) = \quad \text{Equation 12}$$
$$A\left(\cos\left(\frac{\pi}{2}\alpha_i t + \theta_{i-1}\right)\cos(2\pi f_c t) - \sin\left(\frac{\pi}{2}\alpha_i t + \theta_{i-1}\right)\sin(2\pi f_c t)\right)$$

By using the same convention of the OQPSK case, the complex modulating signal, within a given period i is defined as in the following Equation 13:

$$m_i(t) = \cos\left(\frac{\pi}{2}\alpha_i t + \theta_{i-1}\right) + j\sin\left(\frac{\pi}{2}\alpha_i t + \theta_{i-1}\right) \quad \text{Equation 13}$$

The preceding arrived at two Equations for expressing the modulating signal for both sin-shaped OQPSK and MSK during a specific symbol period. In the case of sin-shaped OQPSK, there are two different periods, one for the even chip periods (2k) and another for the odd chip periods (2k+1). In the MSK case, there arrived a single expression for symbol i. For convenience, these are repeated next:

$$m_{2k}(t) = \zeta\sin\left(\pi\frac{t}{2}\right) + j\zeta'\cos\left(\pi\frac{t}{2}\right) \quad \text{Equation 6}$$

$$m_{2k+1}(t) = \zeta\cos\left(\pi\frac{t}{2}\right) + j\zeta''\sin\left(\pi\frac{t}{2}\right) \quad \text{Equation 7}$$

and $$m_i(t) = \cos\left(\frac{\pi}{2}\alpha_i t + \theta_{i-1}\right) + j\sin\left(\frac{\pi}{2}\alpha_i t + \theta_{i-1}\right) \quad \text{Equation 13}$$

In both modulating technique cases, the analyses normalized the chip period ($T_C$) and the symbol period ($T_S$) to one for simplicity. Recall also that both the OQPSK chips ($\zeta$) and MSK symbols ($\alpha$) can only adopt −1 or +1 values. With these various findings and observations, the present inventors observe and duly note the following provided insights:

Either the OQPSK or MSK signal looks identical in time, having a linear excursion in the [0, π/2] range (having normalized the symbol period).

An OQPSK symbol does not have a dependency on the previous symbols.

The OQPSK signals can be represented by alternating the sin and cos functions for even and odd periods.

Given the above and similarities between the waveforms, a preferred embodiment thusly implements a reciprocal modulator and demodulator that is able to operate in the "MSK-domain," that is, availing of certain of the advantages of an MSK modulator, when actually providing a sin-shaped OQPSK modulation waveform, that is, one that may be demodulated to recover the OQPSK chips. In fact, these relationships now may be stated as shown in the following Equations 14 and 15, thereby supporting MSK translation to OQPSK data, and reverse translation as later discussed, per the following:

$$\alpha_{i,i=even} = \begin{cases} -1, \zeta_i = \zeta_{i-1} \\ +1, \zeta_i = \zeta_{i-1} \end{cases} \quad \text{Equation 14}$$

$$\alpha_{i,i=odd} = \begin{cases} +1, \zeta_i = \zeta_{i-1} \\ -1, \zeta_i = \zeta_{i-1} \end{cases} \quad \text{Equation 15}$$

The translation of Equations 14 and 15 also can be expressed in pseudo-code, as is shown in FIG. 5, Table 2. In Table 2, array c corresponds to array of OQPSK chips and array s corresponds to an array α of MSK symbols. Note that in this translation, the current symbol s(k) is a function of k (different function for even and odd symbols) and of c(k) and c(k−1). One skilled in the art could associate this function to a finite impulse response (FIR) filter with two states. In greater detail, the Table 2 code indicates that, for an OQPSK transmitted spreading sequence, defined to start with an odd bit position (i.e., mod(k,2)=1), then a preferred embodiment modified MSK transmitter will convert its bits, to be MSK modulated, according to the following rules:

(1) for an odd chip position value as shown in the upper half of the Table, if the value of a chip in that sequence is equal to the same value as the chip preceding it, the corresponding MSK symbol in that position is equal to 0, whereas if the value of a chip in that sequence is not equal to the same value as the chip preceding it, the corresponding MSK symbol in that position is equal to 1.

(2) for an even chip position value as shown in the lower half of the Table, if the value of a chip in that sequence is equal to the same value as the chip preceding it, the corresponding MSK symbol in that position is equal to 1, whereas if the value of a chip in that sequence is not equal to the same value as the chip preceding it, the corresponding MSK symbol in that position is equal to 0.

To further appreciate Table 2, that code, and hence the translation by a preferred embodiment MSK transmitter of OQPSK chips, is now traced through bits of the spreading sequence $OQPSK_{P40}$ in Table 1 of FIG. 2. Consider, then, the first few bits (understood as chips in OQPSK, but hereafter referred to as bits) in the prior art spreading sequence $OQPSK_{P40}$ for binary value 0 (i.e., 01001110). The first bit in sequence $OQPSK_{P40}$, which is in an odd position (because k=1 and, therefore, mod(1,2)=1), is a value of 0, but there is no knowledge of the bit preceding it, so the Table 1 code cannot produce a valid result, so the corresponding MSK value is unknown, referred to herein as X. The second bit in sequence $OQPSK_{P40}$, which is in an even position, is a value of 1, and the bit preceding it is a value of 0; thus, for this even-bit-position, the lower half of the Table 1 code governs and, as stated in rule (2), above, since the even bit position value is not equal to the odd bit position value that preceded it, then the corresponding MSK output value is 0. The third bit in sequence $OQPSK_{P40}$, which again is in an odd position, is a value of 0, and the bit preceding it is a value of 1; thus, for this odd-bit-position, the upper half of the Table 2 code governs and, as stated in rule (1), above, since the odd position value is not equal to the even bit position value that preceded it, then the corresponding MSK output value is 1. The fourth bit in sequence $OQPSK_{P40}$, which again is in an even bit position, is a value of 0, and the bit preceding it is a value of 0; thus, for this even-bit-position, the lower half of the Table 1 code governs and, as stated in rule (2), above, since the even position value is equal to the odd bit position value that preceded it, then the corresponding MSK output value is 1. From the above discussion and Tables, as well as the examples given, one skilled in the art should be able to readily confirm that sequence $OQPSK_{P40}$, if translated according to the above principles, maps to a corresponding MSK spread sequence as shown in FIG. 6, as Table 3.

A bit-by-bit analysis also may be traced through bits of the spreading sequence $OQPSK_{P41}$ in Table 1 of FIG. 2, that is, the spreading sequence corresponding to a binary value of 1 (i.e., 10110001). The previous discussion should be sufficient to enable one skilled in the art an understanding of such a trace, which reveals that sequence $OQPSK_{P41}$, if translated according to the above principles, maps to a corresponding MSK spread sequence as shown in FIG. 7, as Table 4.

By comparing Tables 3 and 4, note, therefore, that the MSK spreading sequences for binary values of 0 and 1 are identical. In other words, while the OQPSK Hamming distance is maximized to a number N equal to the number N bits in the spreading sequence, that entire gain as translated to and MSK modulator is lost, without further apparatus or methodology. Thus, an OQPSK-to-MSK transformation alone is undesirable to permit directly detecting the sequence in the MSK domain. As detailed below, however, the preferred embodiments include additional aspects so as to reduce or minimize this potential loss in the modulation type translation.

Figures 8, 9:
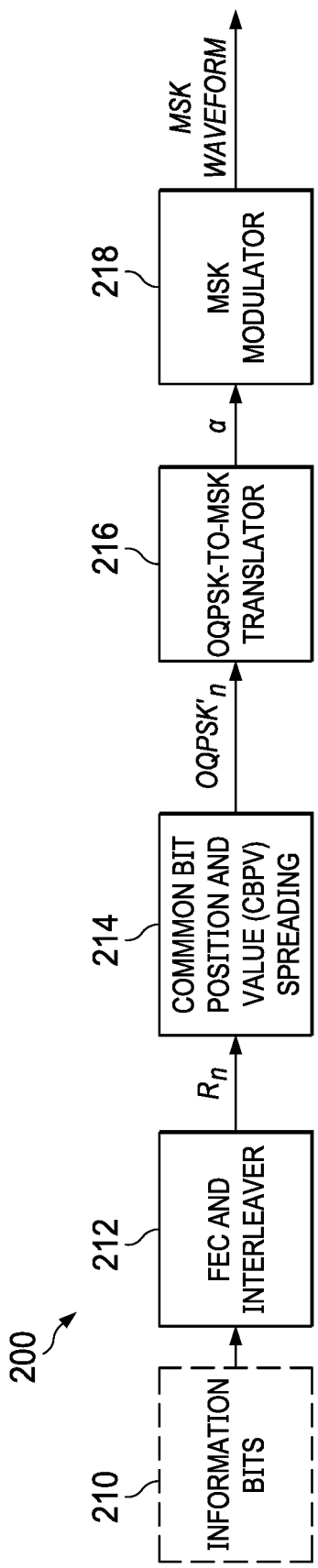
FIG. 8 illustrates a block diagram of a partial signal path in a preferred embodiment OQPSK-to-MSK transmitter (or transceiver).
FIG. 9 illustrates, in a Table 5, a first preferred embodiment of respective OQPSK spreading sequences, corresponding to input values of binary 0 or 1, from block 214 of FIG. 8.

FIG. 8 illustrates a block diagram of a partial signal path in a preferred embodiment OQPSK-to-MSK waveform wireless transmitter (or transceiver), indicated generally at 200. In transmitter 200, information bits are provided from source circuitry (shown by dashed lines). As with the earlier discussion, information bits are intended to be the raw data, provided by appropriate circuitry, for communication, sometimes referred to baseband data, and which can represent various types of information, such as voice, image, control, and other data types. The information bits are input to an FEC (forward error correction) and interleaver block 212. FEC and interleaver block 212 adds FEC correction to the data, and interleaving as known in the art re-arranges the ordering of data (e.g., rows to columns) so as to further enhance signal-to-noise (SNR) strength. The output of FEC and interleaver block 212 is a binary stream, $R_n$.

The $R_n$ output of FEC and interleaver block 212 is connected to a preferred embodiment common bit position and value (CBPV) spreading block 214. Indeed, as detailed below, the preferred embodiment OQPSK-to-MSK translation, when applied to the bit spreading imposed by block 214, provides additional benefits in the integrity of the signal once received by a counterpart receiver (or transceiver). By way of first observations in this regard, block 214 converts (or spreads) each binary value of $R_n$ into a spread sequence of N (e.g., N=8) bits, so as to provide an output stream $OQPSK'_n$ chips, but does so using an improved methodology as compared to spread sequences of prior art OQPSK transmitters. Specifically, and as suggested by the terminology of "common bit position and value (CBPV) spreading," for each binary value (i.e., either 0 or 1) of $R_n$ received as an input, the value is spread into a multiple bit sequence ("chip sequence"), but in preferred embodiments selected common (i.e., mutually aligned) bit positions within each sequence have common (i.e., the same) values, that is, for a given bit position BP(k) in the sequence for a binary 0, then for that same position BP(k) in the sequence for binary 1, the sequence has a same value of either 0 or 1. For example, a first preferred embodiment spread is as shown in Table 5 of FIG. 9. In Table 5, the far left column shows the received value of $R_n$ as either 0 or 1, and the remaining eight columns show the binary values used for the 8-bit spread sequence for either value of $R_n$, starting at bit position BP(0), then to BP(1), and so forth through bit position BP(8). Also, for sake of reference in this document, the spreading sequence for $R_n$ for a binary value of 0 is referred to as OQPSK'$_0$, while the spreading sequence for $R_n$ for a binary value of 1 is referred to as OQPSK'$_1$, with these conventions also shown in parenthesis in Table 5. Moreover, note that the respective binary values, for OQPSK'$_0$ and OQPSK'$_1$, are complementary in bit positions BP(1), BP(2), BP(4), BP(5), BP(7), and BP(8); however, for the bit position BP(3) common to both the sequence for OQPSK'$_0$ and OQPSK'$_1$, or for the BP(6) common to both OQPSK'$_0$ and OQPSK'$_1$, with both positions being highlighted in FIG. 9 using vertically-oriented ovals, there are common respective binary values per each bit position (i.e., a common value of "1" in position BP(3) and a common value of "0" in position BP(6). Thus, while preferred embodiment implements respective spreading sequences of N bits, the Hamming distance (i.e., number of differing bits at respective bit positions) as between the sequences in their entirety is an integer M<N; for example, in the instance of Table 5, N=8, while M=6. Further in a preferred embodiment, the common bit positions where common values are implemented are preferably in non-adjacent bit positions. Hence, in the example of Table 5 shown in FIG. 9, bit position BP(3) is adjacent bit positions BP(2) and BP(4), but not adjacent the other common value bit position BP(6). Additional benefits of the various aspects of block 214 are discussed, later.

The OQPSK output of block 214 is input to an OQPSK-to-MSK translator 216. Translator 216 performs a translation in accordance with the earlier discussion, such as described by the pseudo code of Table 2 in FIG. 5, thereby producing a symbol stream α. The symbol stream α is input to an MSK modulator 218, which may be constructed according to known techniques in the MSK art (e.g., FM modulation), so as modulate and transmit MSK symbols as an MSK waveform.

The preferred embodiment implementation of block 214 implementing common respective binary values per selected bit positions in the respective binary spread sequences provides various technological improvements, including one or more of reduced implementation complexity, improved signal to noise ratio, and improved data accuracy, which are now further explored.

By comparing the prior art OQPSK transmitter 100 of FIG. 1 with the preferred embodiment OQPSK waveform transmitter 200 of FIG. 8, one skilled in the art will readily appreciate at least two benefits of the inventive scope. First, note that OQPSK waveform transmitter 200 eliminates or excludes the bit differential encoding (BDE) structure, whereby the FEC and interleaved data is directly connected to a spreading block (that also implements the common bit position aspect described above), without therefore an intervening BDE apparatus. Second, with the elimination of BDE functionality, there is improved SNR; specifically, when BDE is implemented, then a receiver needs to compare the current symbol with the previous symbol to decide which bit was transmitted, in essence reversing the encoding operation of Equation 1. However, in the receiver, both the current and previous symbols are affected by noise, so the prior art requirement of reversing the BDE encoding compares two symbols corrupted by noise, thereby doubling the noise contribution as the noise from both symbols contribute to the final decision and, indeed, literature lists BDE as having a 3 dB performance penalty. In contrast, the preferred embodiment elimination of BDE eliminates the noise from the comparison reference symbols, in which case only the incoming symbol is susceptible to noise corruption, not the stored reference, thereby reducing the prior art SNR noise penalty.

The preferred embodiment also improves data accuracy in the MSK domain, as is now explored. Specifically, to further appreciate the data accuracy, the block 216 translation provided by transmitter 200 of the preferred embodiment OQPSK'$_n$ code of Table 5 in FIG. 9 is now considered. First, consider the spreading sequence OQPSK'$_0$ shown in Table 5, and its potential interpretation in the MSK domain. Consider, then, the first few bits of the spreading sequence OQPSK'$_0$ (i.e., 01110010). The first bit in that sequence, which is in an odd position, is a value of 0, and in this example again there is no knowledge of the bit preceding it, so the translation to MSK code cannot produce a valid result, so the corresponding MSK value is unknown, again referred to herein as X. The second bit in sequence OQPSK'$_0$, which is in an even position, is a value of 1, and the bit preceding it is a value of 0; thus, for this even-bit-position, the lower half of the Table 1 code governs and, as stated in rule (2), above, since the even bit position value is not equal to the odd bit position value that preceded it, then the corresponding MSK output value is 0. The third bit in sequence OQPSK'$_0$, which again is in an odd bit position, is a value of 1, and the bit preceding it is a value of 1; thus, for this odd-bit-position, the upper half of the Table 2 code governs and, as stated in rule (1), above, since the odd position value is equal to the even bit position value that preceded it, then the corresponding MSK output value is 0. The fourth bit in sequence OQPSK'$_0$, which again is in an even bit position, is a value of 1, and the bit preceding it is a value of 1; thus, for this even-bit-position, the lower half of the Table 1 code governs and, as stated in rule (2), above, since the even position value is equal to the odd bit position value that preceded it, then the corresponding MSK output value is 1. From the above discussion and Tables, as well as the examples given, one skilled in the art should be able to readily confirm that sequence OQPSK'$_0$, if translated according to the above principles, maps to a corresponding MSK spread sequence as shown in FIG. 10, in the first data row of Table 6, immediately below the heading row. In addition, one skilled in the art likewise may trace the Table 5 spreading sequence OQPSK'$_1$ and its potential translation by an MSK receiver, which will confirm the resulting mapping to a corresponding MSK spread sequence as shown in FIG. 10, as the second data row of Table 6.

Given the results of Table 6, note that the Hamming distance of the transmitted OQPSK spreading sequence is six, as opposed to eight in the prior art, but the Hamming distance of the MSK translated spreading sequence, that is, realized in the MSK domain, is four, as opposed to zero in the prior art. In another observation, for every non-adjacent common bit position into which CBPV spreading block 214 locates a same value, a Hamming distance of twice that number of bit positions is achieved in the MSK domain; hence, in the present example, where block 214 has inserted a same value into two non-adjacent bit positions (i.e., positions BP(3) and BP(6)), Hamming distance of four (i.e., twice the number of two common value bit positions) is achieved. Thus, the preferred embodiment CBPV spreading block 214, in this first example provided, considerably improves Hamming distance in the MSK domain. In a related matter, note, therefore, that the common bit positions with complementary values (i.e., giving rise to the Hamming distance of four) in the MSK domain are highlighted in FIG. 10 using vertically-oriented ovals, which reveals a different pattern, or "signature," in the MSK domain for OQPSK'$_0$ versus OQPSK'$_1$, where the former has a signature of 0111 while the latter has a signature of 1000. Thus, in a preferred embodiment, an MSK receiver is operable to decode, in MSK domain, just these bit positions (i.e., in bit positions BP(3), BP(4), BP(6), and BP$_{(7)}$), rather than all N of the spreading sequence bits, so as to properly decode the pre-spread value of either R$_0$ or R$_1$. Hence, the preferred embodiment provides improved data accuracy, as well as more efficient decoding in the process.

Recalling that CBPV block 214 converts (or spreads) each binary value of R$_n$ into a spread sequence of N (e.g., N=8) bits so as to provide an output stream OQPSK'$_n$, a second preferred embodiment spread is as shown in Table 7 of FIG. 11. In Table 7, the far left column shows the value of R$_n$ as either 0 or 1, and the remaining eight columns show the binary values used for the 8-bit sequence OQPSK'$_n$ for each value of R$_n$, starting at bit position BP(1), then to BP(2), and so forth through bit position BP(8). In this alternative example, note that the respective binary values, for OQPSK'$_0$ and OQPSK'$_1$, are complementary in bit positions BP(1), BP(3), BP(5), and BP(7); however, for bit positions BP(2), BP(4), BP(6), and BP(8) common to both sequences OQPSK'$_0$ and OQPSK'$_1$, with those positions being highlighted in FIG. 11 using vertically-oriented ovals, there are common respective binary values per each bit position (i.e., a common value of "1" in positions BP(2) and BP(8), and a common value of "0" in positions BP(4) and BP(6)). Again in this example, therefore, while the spreading sequence is of N=8 bits, the Hamming distance as between the OQPSK transmitted spreading sequences in their entirety is an integer M<N, where here M=4; thus, here M is maximized relative to N, while still ensuring that common value bit positions are non-adjacent—hence, where N is an even number, this maximization occurs when M is one-half of N. Also again, the common bit positions are preferably in non-adjacent bit positions. Moreover, and for reasons shown below, also in a preferred embodiment, one of the same value common bit positions is in the final position (i.e., BP(8) for N=8) of the sequence, while one of the complementary value bit positions is in the first position of the sequence (i.e., BP(1)).

The second preferred embodiment spread sequence, implemented via CBPV spreading block 214, further improves data accuracy in the MSK domain, as is now explored. Specifically, to further appreciate the data accuracy, the potential translation by an MSK receiver that receives the preferred embodiment OQPSK code of Table 7 is now considered, first by examining the spreading sequence OQPSK'$_0$ shown in Table 7, and its potential interpretation by an MSK receiver. Consider, then, the first few bits in that spreading sequence OQPSK'$_0$ (i.e., 01100011). The first bit in that sequence, which is in an odd position, is a value of 0. Recall in the first preferred embodiment that there was no knowledge of the bit preceding it a first bit in a sequence; in this second preferred embodiment, however, note that both sequences OQPSK'$_0$ and OQPSK'$_1$ end with the same the binary value (i.e., of 1), so that when a new sequence is encountered, it is known that the bit preceding that new sequence was the final, and known, value of the spreading sequence that preceded it. Hence, the fixed, and common value, at the end of each spreading sequence provides information for converting the first bit of the next sequence. Thus, in the present example of OQPSK'$_0$ which begins with the value of 1, and with the last bit in either OQPSK'$_0$ or OQPSK'$_1$ ending in 1, then the translation to MSK code, for this first (and odd position) bit is by the odd-bit-position upper half of the Table 1, and as stated in rule (1), above, since the odd bit position value is not equal to the even bit position value that preceded it, then the corresponding MSK output value is 1.

The second bit in sequence OQPSK'$_0$, which is in an even position, is a value of 1, and the bit preceding it is a value of 0; thus, for this even-bit-position, the lower half of the Table 1 code governs and, as stated in rule (2), above, since the even bit position value is not equal to the odd bit position value that preceded it, then the corresponding MSK output value is 0. The third bit in sequence OQPSK'$_0$, which again is in an odd position, is a value of 1, and the bit preceding it is a value of 1; thus, for this odd-bit-position, the upper half of the Table 2 code governs and, as stated in rule (1), above, since the odd bit position value is equal to the even bit position value that preceded it, then the corresponding MSK output value is 0. The fourth bit in sequence OQPSK'$_0$, which again is in an even position, is a value of 0, and the bit preceding it is a value of 1; thus, for this even-bit-position, the lower half of the Table 1 code governs and, as stated in rule (2), above, since the even position value is not equal to the odd bit position value that preceded it, then the corresponding MSK output value is 0. From the above discussion and Tables, as well as the examples given, one skilled in the art should be able to readily confirm that sequence QPSK'$_0$, if translated according to the above principles, maps to a corresponding MSK spread sequence as shown in the far right of FIG. 12, Table 8, which in its first data row shows the spreading sequence of OQPSK'$_0$ and the corresponding MSK spreading sequence.

In addition, one skilled in the art likewise may trace the Table 7 spreading sequence OQPSK'$_1$, and its potential interpretation by an MSK receiver, which will confirm the resulting mapping to a corresponding MSK spread sequence as shown in Table 8 of FIG. 12, as the bits in the far right of the second data row of Table 8. Given the results of Table 8, note that the Hamming distance of the OQPSK spreading sequence is four, as opposed to eight in the prior art, but the Hamming distance of the MSK spreading sequence, that is, realized by an MSK receiver, is eight, as opposed to zero in the prior art. As with the first preferred embodiment, therefore, for every non-adjacent common bit position into which CBPV spreading block 214 locates a same value, a Hamming distance of twice that number of positions is achieved in the MSK domain; hence, in the present example, where block 214 has inserted a same value into four non-adjacent bit positions (i.e., positions BP(2), BP(4), BP(6), and BP(8)) in the OQPSK transmitted domain, a Hamming distance of eight (i.e., twice the number of two common value positions) is achieved in the MSK received domain. Thus, the preferred embodiment CBPV spreading block 214, in this second example provided, further improves Hamming distance in the MSK domain. In a related matter, note, therefore, that the common bit positions with complementary values (i.e., giving rise to the Hamming distance of eight) in the MSK domain are highlighted in FIG. 12 using vertically-oriented ovals, which reveals a different pattern, or signature, in the MSK domain for OQPSK'$_0$ versus OQPSK'$_1$, where the former has a signature of 10000111 while the latter has a signature of 01111000.

Figures 13, 14:
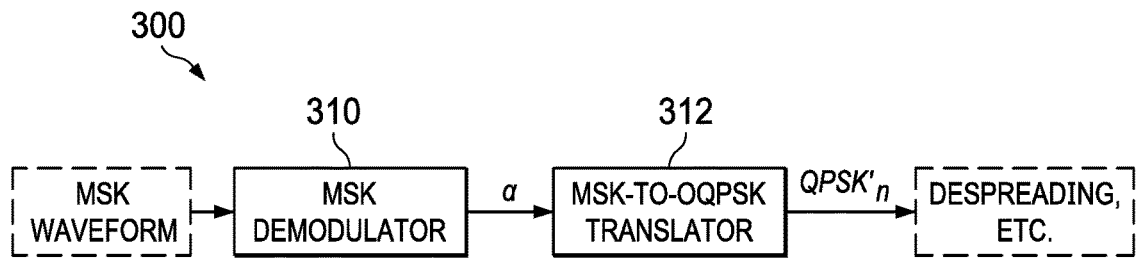
FIG. 13 illustrates a block diagram of a partial signal path in a preferred embodiment MSK-to-OQPSK receiver (or transceiver).
FIG. 14 illustrates pseudo code for the translation of N bits from MSK to OQPSK.

Having demonstrated a preferred embodiment implementation of an equivalent OQPSK modulator by means of an OQPSK-to-MSK conversion followed by a MSK modulator stage in transmitter 200 of FIG. 8, also contemplated in a preferred embodiment is a similar receiver of the transmitter 200 signal waveform, and with sufficient reversal of the transmitting operations so as to recover the original OQPSK baseband data. In this regard, FIG. 13 illustrates a partial block diagram of the first few stages of such a receiver (or transceiver) 300. Thus, receiver 300 receives the MSK waveform (see, e.g., Equation 12) and couples it to an MSK demodulator 310, which may be constructed according to known MSK art principles. Thus, receiver 300 includes the previously-described advantages in its demodulator 310, such as lower hardware complexity and cost. MSK demodulator 310 thus converts the received waveform to symbols (shown in FIG. 13 as a) and those symbols are coupled to an MSK-to-OQPSK translator 312. Translator 312 performs a reverse operation relative to OQPSK-to-MSK translator 216 of transmitter 200, so as to recover the OQPSK chips from MSK symbols. In this regard, FIG. 14 illustrates a Table 9 with MSK-to-OQPSK translating pseudo code corresponding to the reversal of the OQPSK-to-MSK translating pseudo code of Table 2 in FIG. 5, and one skilled in the art should readily understand the former in view of the earlier details with respect to the latter. Thus, MSK-to-OQPSK translator 312 translates its input MSK symbols to output OQPSK chips (shown in FIG. 13 as QPSK'$_n$). Finally, note that the output chips are then connected to additional blocks, which are not shown so as to simplify the illustration and discussion, but one skilled in the art will readily appreciate as the converse to the spreading and FEC and interleaving functions form transmitter 200 of FIG. 8.

From the above, various preferred embodiments provide an MSK modulating device configured to communicate OQPSK (e.g., sin-shaped OQPSK) data. Also contemplated is a corresponding receiver to receive the signal waveform from the MSK demodulating device and to recover the originally-transmitted OQPSK data (i.e., chips). Note, therefore, that an entire network system may include plural ones of such devices. Indeed, further contemplated in preferred embodiments is a system with other OQPSK transceivers, in which BDE is eliminated and OQPSK modulation is performed without the MSK translation (e.g., replacing block 118 of FIG. 1 with blocks 216 and 218 of FIG. 8), whereby all such devices are ultimately communicating OQPSK data. For example, one portion the network could implement more expensive and complex OQPSK architectures (for instance, a base station), whereas the other side of the network, battery powered nodes, could implement simpler architectures based on the preferred embodiment teachings described above. With these latter devices, when the CPBV spreading is included, then the signal may be received by an MSK receiver in the system, and the translation of the transmitted signal by the MSK receiver will result in increased Hamming distances in the translated spread data. Various preferred embodiments have various respects and/or benefits. For example, signal to noise ratio is improved. As another example, transmission may be achieved without bit differential encoding. As still another benefit is that various alterations have been provided, and still others may be ascertained. For example, for an N=8 bit spreading sequence, common bit position values may be included in two or four different common bit positions, as described. As another example, while preferred embodiments have been described as between the two different modulation types of OQPSK and MSK, certain aspects may be implemented in other systems whereby a transmitter of a first modulation type includes spreading, as described herein, so as to realize improved performance in a receiver of a second modulation type. Thus, the preferred embodiments have been shown to have numerous benefits, and various embodiments have been provided. Accordingly, while various alternatives have been provided according to the disclosed embodiments, still others are contemplated and yet others may be ascertained by one skilled in the art. Given the preceding, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. A wireless transmitter for transmitting bits to a wireless receiver, comprising:
   circuitry for generating binary data bits that include a first bit and a second bit, wherein the second bit is complementary to the first bit;
   circuitry for providing a first spreading sequence for the first bit in the binary data bits and for providing a second spreading sequence for the second bit in the binary data bits;
       wherein each of the first and second spreading sequences consists of an integer number N of bits;
       wherein the circuitry for providing provides a same bit value in an integer number M of bit positions in the first and second spreading sequences;
       wherein M<N; and
       wherein the first and second spreading sequences are of a first modulation type; and
   circuitry for translating the first and second spreading sequences to a second modulation type.

2. The wireless transmitter of claim 1 wherein the circuitry for providing provides the same bit value in M non-adjacent bit positions in the first and second spreading sequences.

3. The wireless transmitter of claim 1 wherein M equals one-half of N.

4. The wireless transmitter of claim 1 wherein the circuitry for providing provides a same bit value in a final bit position in the first and second spreading sequences.

5. The wireless transmitter of claim 4 wherein the circuitry for providing provides a different bit value in a first bit position in the first and second spreading sequences.

6. The wireless transmitter of claim 1 wherein the circuitry for providing provides a same bit value in only two bit positions in the first and second spreading sequences.

7. The wireless transmitter of claim 1 wherein the circuitry for generating binary data bits excludes bit differential encoding prior to coupling the binary data bits to the circuitry for providing.

8. The wireless transmitter of claim 1:
   wherein the first modulation type comprises OQPSK and the second modulation type comprises MSK.

9. The wireless transmitter of claim 8:
   wherein the wireless receiver comprises an MSK wireless receiver; and
   wherein a Hamming distance of 2M is achieved by the MSK wireless receiver in an MSK domain.

10. The wireless transmitter of claim 1 wherein N=8.

11. The wireless transmitter of claim 1 and further comprising:
    circuitry for adding error correction bits to the binary data bits; and
    circuitry for interleaving the error correction bits and the binary data bits.

12. A wireless communication system, comprising:
a transmitter for transmitting bits, comprising:
    circuitry for generating binary data bits that include a first bit and a second bit, wherein the second bit is complementary to the first bit;
    circuitry for providing a first spreading sequence for the first bit in the binary data bits and for providing a second spreading sequence for the second bit in the binary data bits;
        wherein each of the first and second spreading sequences consists of an integer number N of bits;
        wherein the circuitry for providing provides a same bit value in a number M of bit positions in the first and second spreading sequences;
        wherein $M<N$; and
        wherein the first and second spreading sequences are of a first modulation type; and
    circuitry for translating the first and second spreading sequences to a second modulation type; and
a receiver for receiving the transmitted bits.

13. The system of claim 12:
wherein the receiver comprises circuitry for translating received bits of the second modulation type to the first modulation type.

14. The system of claim 13 wherein the first modulation type comprises OQPSK and the second modulation type comprises MSK.

15. The system of claim 12 wherein the circuitry for providing provides the same bit value in M non-adjacent bit positions in the first and second spreading sequences.

16. The system of claim 12 wherein M equals one-half of N.

17. The system of claim 12 wherein the circuitry for providing provides a same bit value in a final bit position in the first and second spreading sequences.

18. The system of claim 17 wherein the circuitry for providing provides a different bit value in a first bit position in the first and second spreading sequences.

19. The system of claim 12:
wherein the receiver comprises an MSK wireless receiver; and
wherein a Hamming distance of 2M is achieved by the MSK wireless receiver in an MSK domain.

20. A method of operating a wireless transmitter for transmitting bits to a wireless receiver, comprising:
generating binary data bits that include a first bit and a second bit wherein the second bit is complementary to the first bit;
providing a first spreading sequence for the first bit in the binary data bits;
providing a second spreading sequence for the second bit in the binary data bits;
    wherein each of the first and second spreading sequences consists of an integer number N of bits;
    wherein the providing provides a same bit value in a number M of bit positions in the first and second spreading sequences;
    wherein $M<N$; and
    wherein the first and second spreading sequences are of a first modulation type; and;
converting the first and second spreading sequences from the first modulation type to a second modulation type.

\* \* \* \* \*